(12) United States Patent
Calhoun et al.

(10) Patent No.: US 10,839,184 B2
(45) Date of Patent: Nov. 17, 2020

(54) INTERACTIVE VIRTUAL AGENT CONVERSATION TRIGGERED BY CODED OPTICAL INDICIA

(71) Applicant: Espressive, Inc., Santa Clara, CA (US)

(72) Inventors: Patrice Ronald Calhoun, Sunnyvale, CA (US); Francisco Fernandez, Castro Valley, CA (US); Rohit Kumar Suri, Fremont, CA (US); Yu Xia, San Mateo, CA (US); Alex Manuel Yupanqui, Milpitas, CA (US)

(73) Assignee: Espressive, Inc., Santa Clara, CA (US)

( * ) Notice: Subject to any disclaimer, the term of this patent is extended or adjusted under 35 U.S.C. 154(b) by 0 days.

(21) Appl. No.: 16/045,964

(22) Filed: Jul. 26, 2018

(65) Prior Publication Data

US 2020/0034589 A1   Jan. 30, 2020

(51) Int. Cl.
*G06K 7/14* (2006.01)
*H04L 12/58* (2006.01)

(52) U.S. Cl.
CPC ............ *G06K 7/1417* (2013.01); *H04L 51/02* (2013.01)

(58) Field of Classification Search
CPC .............................. G06K 7/1417; H04L 51/02
See application file for complete search history.

(56) References Cited

U.S. PATENT DOCUMENTS

| | | | | |
|---|---|---|---|---|
| 9,876,909 | B1 * | 1/2018 | Klein ................. | H04M 3/5191 |
| 10,402,781 | B2 * | 9/2019 | Terwilliger ............ | G06Q 10/08 |
| 2008/0183852 | A1 * | 7/2008 | Pramer .................. | G06Q 30/02 709/223 |
| 2018/0315107 | A1 * | 11/2018 | Connolly ........... | G06Q 30/0241 |
| 2019/0019090 | A1 * | 1/2019 | Chacko .................. | G06N 5/022 |

OTHER PUBLICATIONS

Asher, N., A Warmer Welcome: Application of a Chatbot as a Facilitator for New Hires Onboarding, Master Thesis, May 30, 2017, 110 pages, Linnaeus University, Sweden.
Kaarma, J., How to use Messenger Parametric Codes, Chatbots Life, Nov. 21, 2017, 15 pages.
Wagner, K., Messenger is finally making it easier to find and use bots, Recode, Apr. 18, 2017, 4 pages.
Using Messenger scan codes to start conversations in specific block?, Facebook Messenger/Ideas—Chatfuel Community, retrieved May 31, 2018, 5 pages.

* cited by examiner

*Primary Examiner* — Seung H Lee
(74) *Attorney, Agent, or Firm* — Almanac IP Advisors LLP

(57) ABSTRACT

A virtual agent for resolving an issue with one or more objects is described, wherein each object is accessible by one or more users of a customer. The virtual agent receives information derived from one or more coded optical indicia specifying an intent of a virtual agent conversation, wherein the intent identifies an issue to be resolved; and based on the intent, process the information to further resolution of the issue. The received information may further specify at least one parameter, wherein the at least one parameter represents supplemental information required for resolution of the issue.

21 Claims, 7 Drawing Sheets

INTERACTIVE VIRTUAL AGENT CONVERSATION TRIGGERED BY CODED OPTICAL INDICIA

BACKGROUND

Field of the Disclosure

This disclosure relates to the field of interactive virtual agents, and more particularly to automatically triggering conversations with such agents.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Conventional approaches to resolving customer service issues rely either totally or partially on human services agents at a help desk for services such as information technology ("IT"), facilities, security or other services. Some approaches employ an on-screen chatbot or virtual agent to gather enough data from the user to enable the human agent at the help desk to resolve an issue without communicating directly with the user. However, current chatbots require the user to engage in text or voice interaction to provide the necessary information. It is desired to reduce the burden on the user to achieve issue resolution.

SUMMARY OF THE DISCLOSURE

Embodiments of the disclosure provide systems, methods and one or more non-transitory computer readable media for resolving an issue with one or more objects, wherein each object is accessible by one of more users of a customer. The embodiments receive information derived from one or more coded optical indicia specifying an intent of a virtual agent conversation, wherein the intent identifies an issue to be resolved; and based on the intent, process the information to further resolution of the issue. The received information may further specify at least one parameter, wherein the at least one parameter represents supplemental information required for resolution of the issue. According to embodiments of the disclosure, resolution of the issue does not require providing a message for display to a user asking for more information to resolve the issue.

Embodiments provide to a service agent (e.g., a human service agent) associated with the customer a request to resolve the issue based upon the intent, or based upon the intent and the at least one parameter.

Glossary

Virtual agent (also known as a chatbot or virtual assistant (can be a subset of conversation AI)): a computer program or artificial intelligence ("AI") designed to simulate conversation with a human user using text or voice.

Intent: the user's intention in having a conversation with a chatbot. Conventionally, a virtual agent tries to determine the intent of a user-entered phrase using technology such as NLP (Natural Language Processing). NLP determines that an input phrase most closely matches a stored phrase corresponding to a specific intent.

Entity: A set of structured data, such as a list of values, that the AI uses to understand the context of a user's statement. An entity may modify an intent. For example, for a conversation concerning an intent to retrieve news stories, some corresponding entities may be "dateTime" and "newsType," with corresponding values specifying members of the particular entity class. Entities are sometimes referred to as "slots." As another example in the case of an intent to print a document, different entities may classify user name, company locations at which printers reside, printers in a building by printer ID, name of the company that owns a printer, etc. Entities provide shared data that may be used by a number of intents.

Parameter: A data element or variable required by the chatbot to process logic for a specific conversation. Referring to the news example above, if a user types "show me yesterday's financial news", the intent is to retrieve news, and the parameters corresponding to the entities "dateTime" and "newsType" are "yesterday" and "financial." Parameters may be data gathered from asking the user, or data that is already known by, e.g., inferring it from the context. As another example, if a chatbot has an intent for a user wanting to request ice cream that is automatically served by a machine, required parameters might include "flavor of ice cream" and "number of scoops." The term "flavors" may refer to an entity storing an authorized list of flavors. The chatbot may compare input parameters with members of the entities to determine whether there is a match.

A "user" generally refers to an end user of an object, where "object" here refers to a physical object (e.g., a printer) or a service (e.g., a word processing application). The term "customer" may refer to an actual customer of the provider of the issue resolution system or any business entity that employs the system.

QR Code: A graphical image that is coded so that it can interpreted by an QR Code scanner or reader. Unlike bar codes of old, which could only store alphanumeric characters, a QR code can contain more advanced information such as string of text, an web URI, contact information, and more.

Web URI: also known as Web URL. Uniform Resource Locator: a protocol for specifying addresses on the Internet. The URI can include specific arguments or parameters that get passed to the receiving web site or web service.

BRIEF DESCRIPTION OF THE DRAWINGS

FIG. 3A and FIG. 3B illustrate a conversation on a client-side screen in an example of a conventional approach to engaging with a chatbot.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

Figure 1:
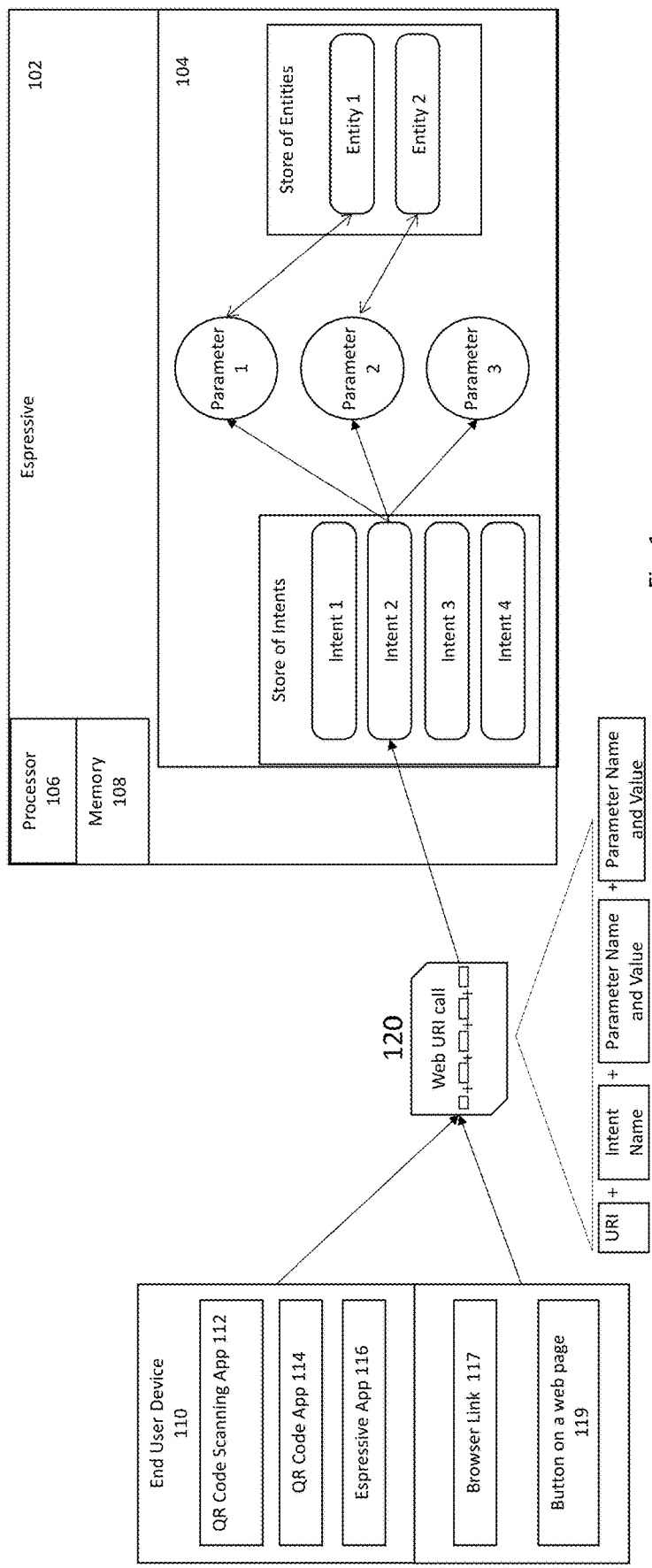
FIG. 1 illustrates conversational chatbot engine, according to embodiments of the disclosure.

FIG. 1 illustrates conversational chatbot engine 102 (denoted here by "Espressive"), which includes a database or other memory 104 (referred to herein collectively as a "database" for convenience), according to embodiments of the disclosure. The chatbot engine 102 includes at least one processor 106 and one or more memories 108 storing instructions to execute functions described as performed herein, e.g., functions performed by the chatbot engine 102 to ingest and process chatbot requests. The chatbot engine 102 may be an application service in a SaaS environment to support multiple customers. Customers of the provider of the chatbot engine 102 may support their employees by giving them access to the chatbot engine 102 via the app 116.

The database 104 stores intents, parameters, and entities, according to embodiments of the disclosure.

Via a user's client computing device 110 (e.g. a smartphone), the user may activate an optical code reading app 112 to scan an optical code, such as a QR code or a bar code. In embodiments, the QR code scanning app 112 may be a third party app or native to the device 110. A QR code app 114 transforms the data output by the scanning app 112 into a format readable by other applications that process the data. Those skilled in the relevant art will understand that the QR code scanning app 112 and QR code app 114 may be combined into one app. The QR code scanning app 112 and QR code app 114 may then automatically activate a client-side customer service app 116 (e.g., "Espressive" app) to access the customer service chatbot engine 102. The information generated by the client device may be transferred to the chatbot system via a URI call 120 over the Internet or other network.

The URI call 120 may include: URI of the desired chatbot, intent identifier, and one or more parameter identifiers and corresponding values that contain data required by the conversation associated with the intent. A parameter in an intent may correspond to an entity. According to embodiments of the disclosure, the entity may contain specific data for things owned by the customer and used by a user (e.g., an employee of the customer). For example, an entity identifier may identify one or more printers.

The client device 110 may also include conventional interface user elements enabling the transfer of information to the conversational chatbot, e.g., a browser link or a web page button.

The end user (e.g., employee) is able to directly access the chatbot from a QR code or other interaction. In this case, the chatbot engine 102 receives specific information from the URI call that allows it to know the intent of the user.

Figure 2:
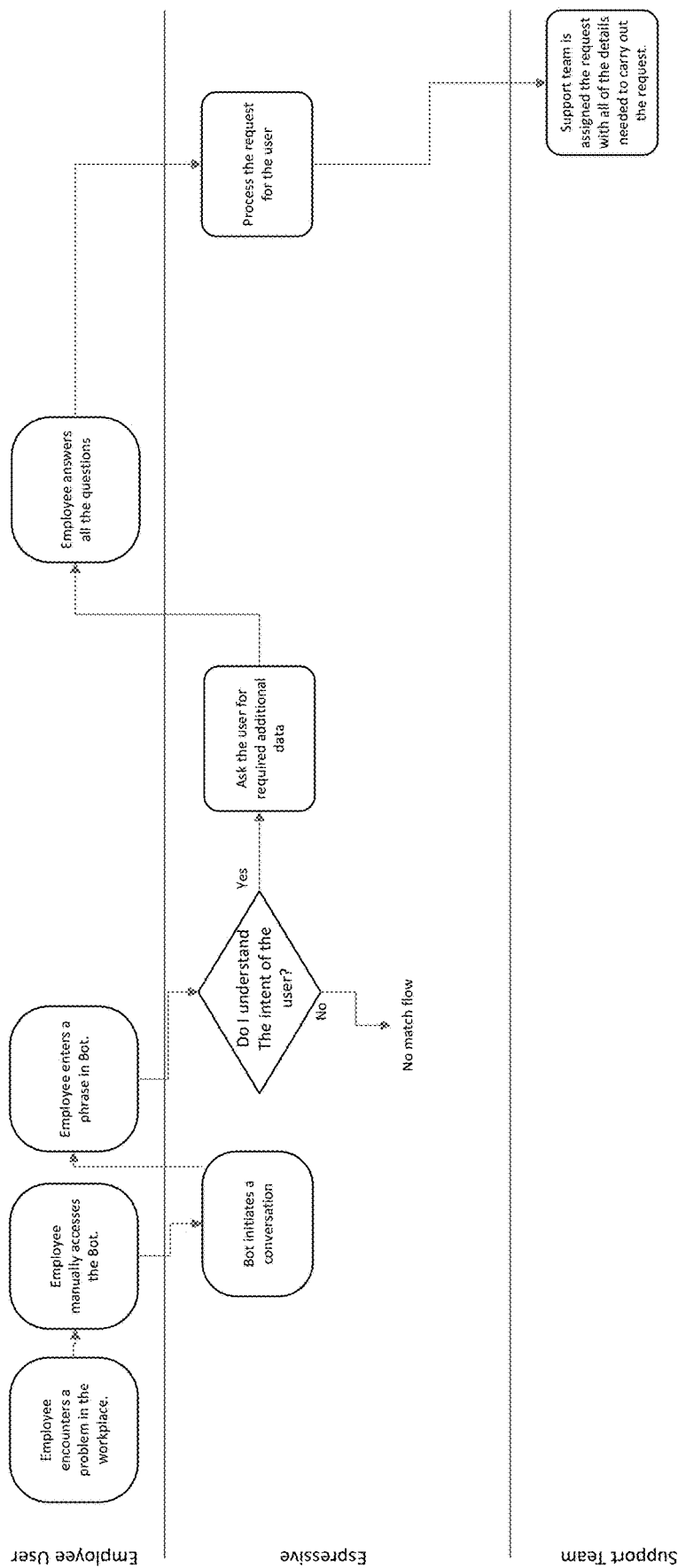
FIG. 2 is a flow diagram illustrating an example of conventional handling of an issue via manual access of a chatbot.

FIG. 2 is a flow diagram illustrating an example of conventional handling of an issue via manual access of a chatbot. In this example, a user (e.g., employee of a customer of the chatbot service) encounters an issue in their workplace (202) and manually access the bot (204). Manual access may be, for example, via a touchscreen button or a voice command.

In response, the chatbot services system initiates a conversation with the employee (206). The employee enters a phrase in the client-side bot app to express the nature of the problem (208).

In response, the chatbot system compares the employee input to a set of stored intents (210). The comparison may be performed using natural language processing, AI or other known means, according to embodiments of the disclosure.

If the chatbot system does not understand the user's intent, then the chatbot system halts the conversation (212). If there is a match, then, if the chatbot system requires more data to process the conversation and resolve the issue, it asks for more data (214).

In response, the user answers the chatbot's request (216), and the chatbot system processes the user's request (218). The chatbot system may forward the user's request to a support team for handling (220).

Figures 3A, 3B:
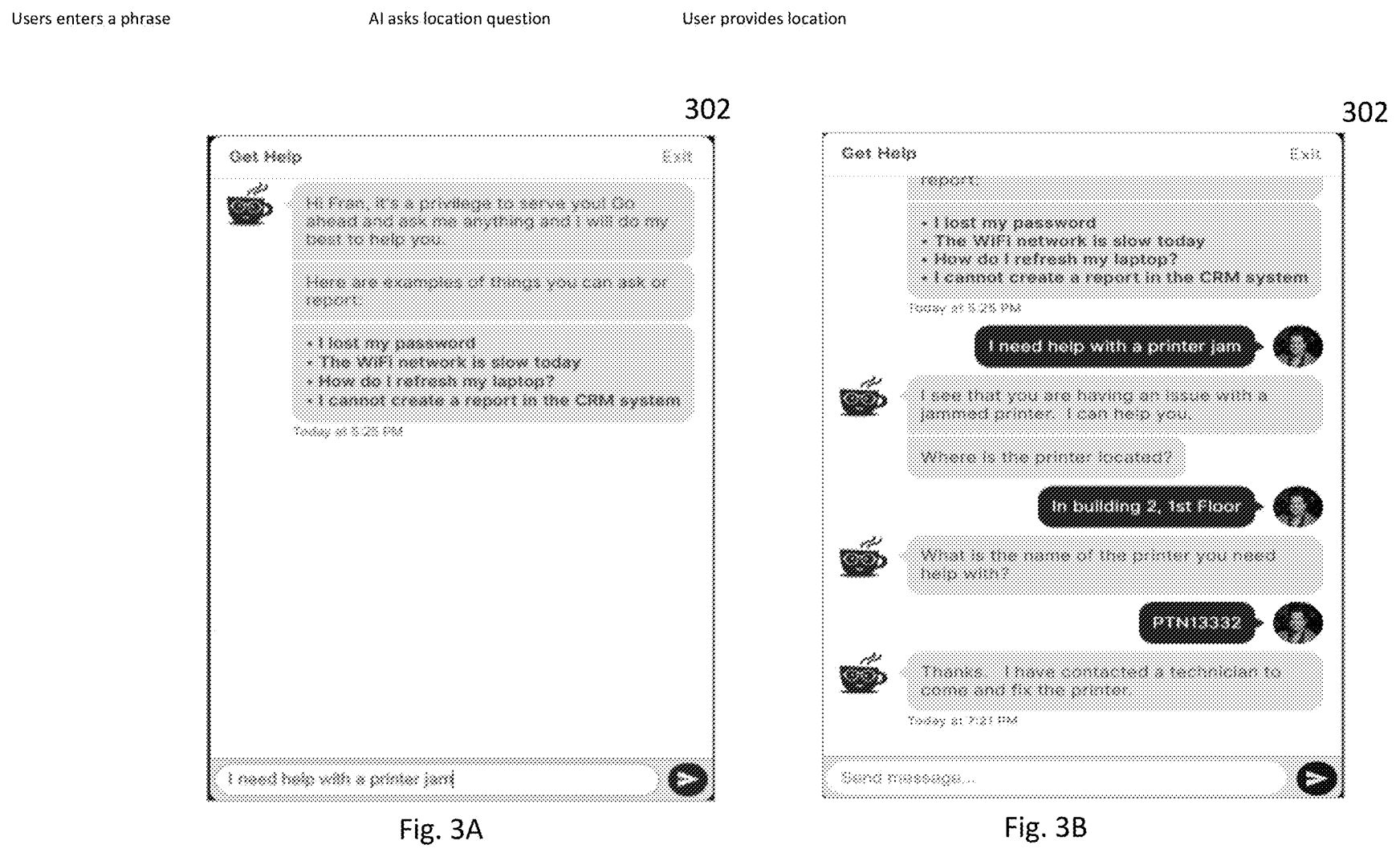

FIG. 3A and FIG. 3B illustrate a conversation on the user interface of the client-side screen 302 in an example of a conventional approach to engaging with a chatbot. FIG. 3A illustrates initial messages provided by the chatbot. FIG. 3B illustrates the same conversation with those initial messages having scrolled up off the screen. The customer service app in this example transmits to the conventional chatbot the url https://demo.espressive.com/app/barista, which causes the chatbot to launch a customer service chatbot, here named "barista." In this example, to engage in a conversation to resolve a printer issue, the user must enter on the screen a number of inputs including the nature of the issue ("printer jam"), which represents the intent, printer location ("building 2, $1^{st}$ floor"), and printer name ("PTN13332").

Figure 4:
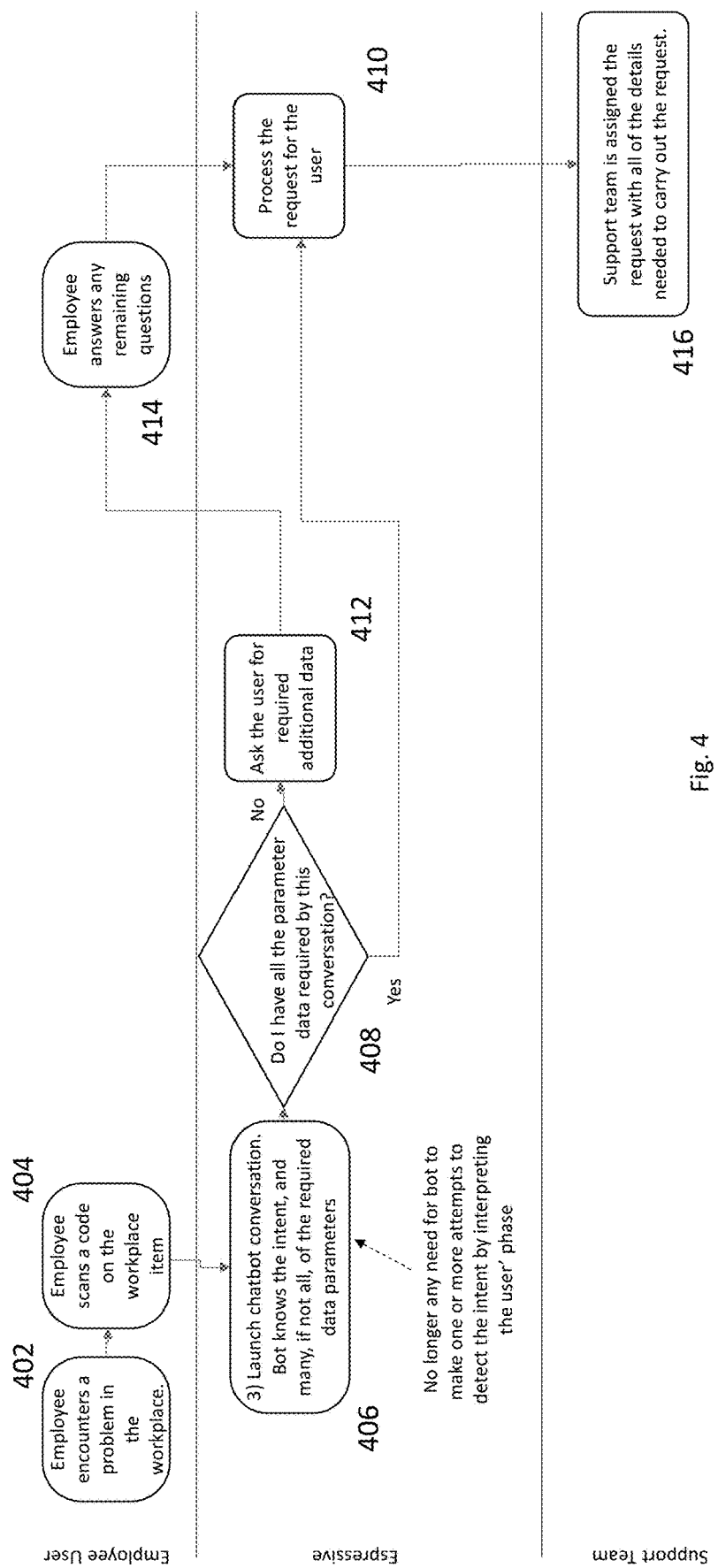
FIG. 4 illustrates a chatbot services system processing a user request according to embodiments of the disclosure.u

FIG. 4 illustrates a chatbot services system processing a user request according to embodiments of the disclosure. In this example, an employee user encounters an issue in his workplace (402). For example, Employee Joe goes to check on his print job in a shared printer on his floor and discovers he has a problem. The printer appears to be jammed and he needs help to fix it.

The user scans an optical code, e.g., a QR code on an item associated with the issue to be resolved (404). For example, Joe notices there is a QR code on the printer that has some instructions: "Scan this code if you need help." Joe takes out his iPhone and scans the code with his photo app.

In response, the client-side customer service (here, "Espressive") app 116 is launched directly on the AI chat screen on his client iPhone (406). Barista, the virtual agents says, "I see that you are having problems with printer HP-4884ADS on Building 1, Floor 2." Conventionally, Joe would have had to find the Espressive app, then find the button to access the Chat AI. Then he would have had to describe the issue he was having and hope the chatbot understood it. In this case, the chatbot engine 102 knows from the QR code scan the intent and also one or more parameters required to resolve the issue (406). The chatbot engine 102 may receive these parameters as they are passed along in the URL encoded by the scanned QR code. Unlike in conventional systems, the chatbot engine 102 does not need to employ other means to derive intent, according to embodiments of the disclosure.

In response, the chatbot engine 102 determines whether it possesses all the parameter data required to resolve the issue that is the subject of the conversation (408). If it does, the chatbot engine 102 proceeds to process the request for the user (410). If not, the chatbot engine 102 asks the user for the remaining data (412). In this example, the chatbot engine 102 causes virtual agent Barista to ask Joe, "What is the specific problem you are having?"

In response, the user answers the question(s) (414), and the chatbot engine 102 receives the answer(s). In this example, Joe taps on "Printer Jam" from a list displayed on his screen by the chatbot engine via the client-side app. Conventionally, the chat AI would have asked him to select the printer from a list, then it would have asked him to pick a location from another long list.

The chatbot engine 102 then proceeds to process the request for the user (410). In this example, the chatbot agent Barista responds that help is on the way and Joe closes the app. The chatbot engine 102 has everything it needs to process the request. The intent is configured to cause the chatbot engine to create a service request for the IT Department.

The chatbot engine 102 may forward the user's request to an IT support team for handling (416). The IT department receives a ticket from the chatbot engine 102 with information on the location and specific printer. It dispatches a technician to the printer and has it fixed.

Figure 5:
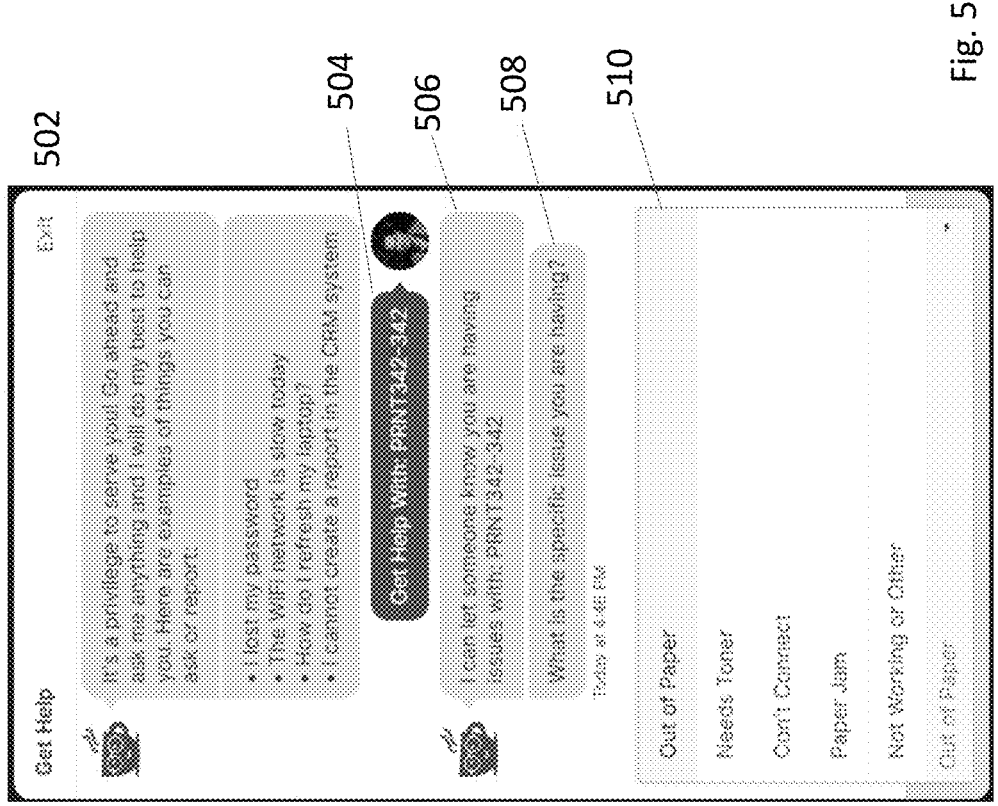
FIG. 5 illustrates a user interface screen of a smartphone employing a chatbot customer service app according to embodiments of the disclosure.

FIG. 5 illustrates a user interface on the screen 502 of a smartphone employing the chatbot customer service app 116 according to embodiments of the disclosure. In embodiments, the user has used the scanning app 112/code app 114 to scan a QR code from a label on or near a printer having ID number PRNT342-342. In this example, the QR code includes information concerning an intent to resolve an issue with the identified printer. The client-side chatbot app 116 on the client device 110 may transmit to the chatbot engine 102 a URI call including the intent and a parameter, e.g., https://demo.espressive.com/app/barista?intent=PrinterProblem&PrinterName=PRNT342-342. In this example, the intent is identified by "intent=PrinterProblem," and the parameter is identified by "PrinterName=PRNT342-342," which represent an issue encountered with the identified printer, PRNT342-342. Those skilled in the art will recognize that the intent ID may take other forms.

In response, in this example the chatbot engine 102 causes the client-side screen 502 to display the printer identifier 504 as if the user had entered it on the screen directly.

The chatbot engine 102 may respond as if in a typical conversation with an acknowledgment of the printer issue (506). If necessary, it may cause display of a follow-up question 508 that may require user input, "What is the specific issue you are having?", and display a drop down menu 510 from which the user may identify the specific issue. This example illustrates a hybrid conversation in which the chatbot engine 102 initially identifies the issue via the QR code, but requires further information to be entered by the user to resolve the issue.

Alternatively, the QR code may include all the parameters needed for issue resolution, along with the intent. By providing enough parameters in addition to the intent, the chatbot engine 102 would avoid the need to ask the user for further information about the nature of the issue (e.g., the chatbot engine would not need to ask "What is the specific issue you are having?).

Figure 6:
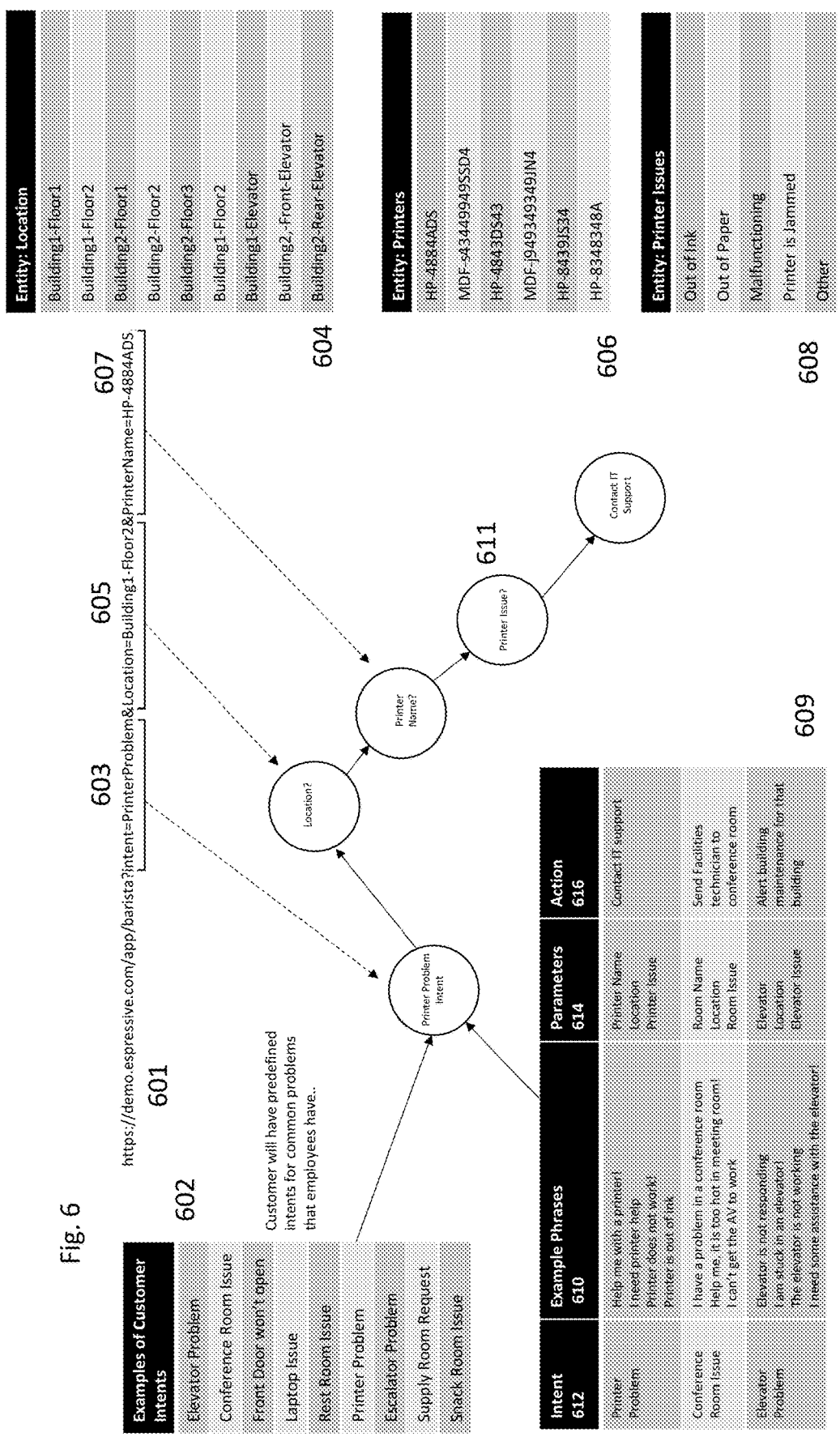
FIG. 6 illustrates another example of a conversation in which the QR code includes an intent and parameter, according to embodiments of the disclosure.

FIG. 6 illustrates another example of a hybrid conversation in which the QR code includes an intent and parameter, but the chatbot engine 102 still needs to ask a question about the printer issue, according to embodiments of the disclosure. In this example, the database stores examples of customer intents 602 and example entities such as locations 604, printers 606 and printer issues 608.

The database may also store a table 609 including example phrases 610 corresponding to customer inputted phrases that may be matched with intents 612 via natural language processing. In the table, each intent corresponds to parameters 614 required for issue resolution and action 616 to be taken for resolution. Depending upon the configuration of the conversation, the chatbot engine 102 may obtain zero, some or all of the parameters from the URI from which the intent is obtained. The intents can be triggered normally by detecting user language that is close enough to the example phrases for that intent. Once triggered, the chatbot engine 102 will gather the parameter data and execute the specified action.

In this example of a hybrid conversation, instead of the chatbot engine 102 recognizing the intent and asking all of the required parameters, this URI will recognize all but one parameter from the scanned URI and go directly to asking the user for the missing parameter. In this example, the chatbot engine 102 receives the URI encoded with information from the scanned QR code. The URI is https://demo.espressive.com/app/barista?intent=PrinterProblem&Location=Building1-Floor2&PrinterName=HP-4884ADS 601. The chatbot engine 102 parses the URI to identify the intent as PrinterProblem 603. According to the table, this intent 612 requires three parameters 614. Here, the chatbot engine 102 parses from the URI two of the parameters as identifying the Location 605 of the problem as Building1-Floor2, for the printer with PrinterName=HP-4884ADS 607. Thus, the chatbot engine 102 only needs to ask the user for the the third parameter, i.e., Printer Issue 611.

Computer System Implementation

Figure 7:
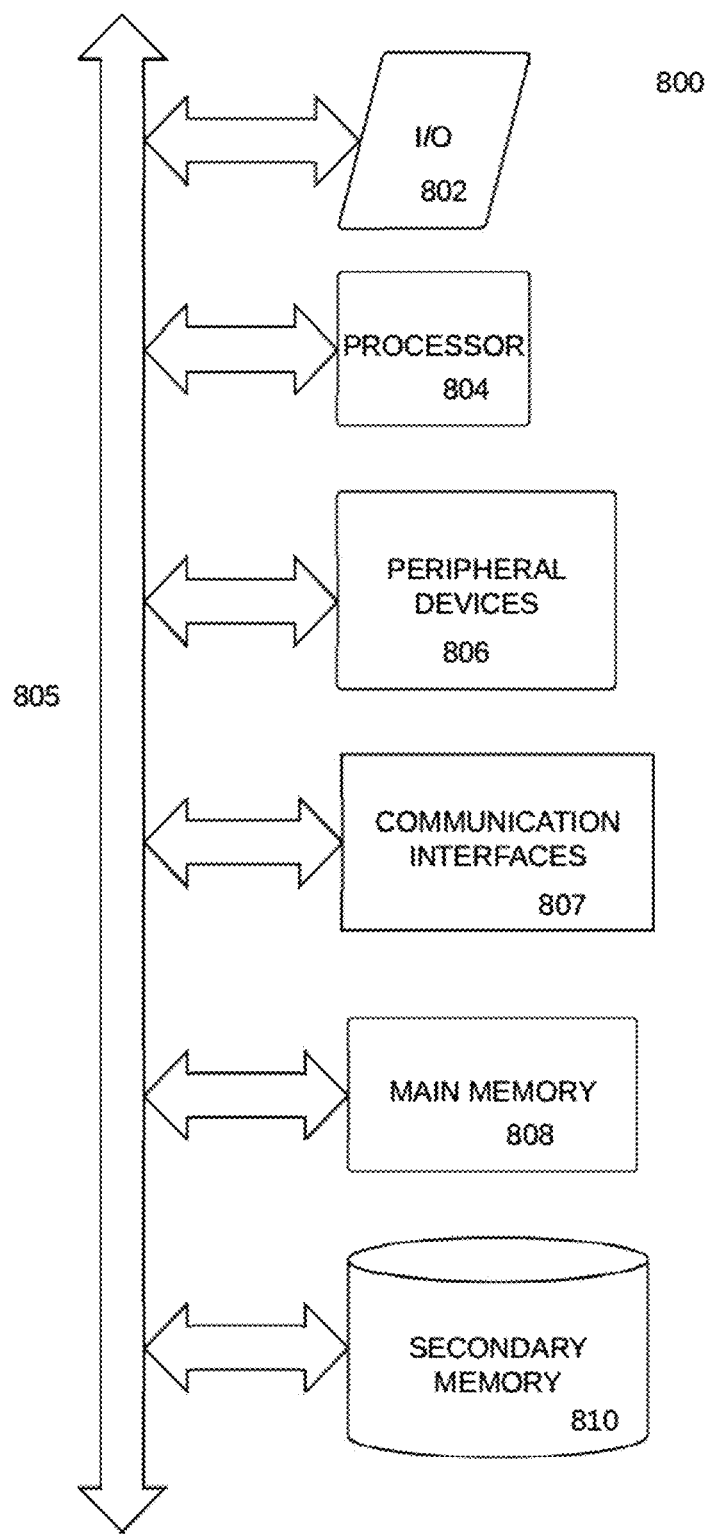
FIG. 7 illustrates an example of a computer system 800 that may be used to execute program code stored in a non-transitory computer readable medium (e.g., memory) in accordance with embodiments of the disclosure.

FIG. 7 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users and/or other computer systems depending upon the application. The I/O subsystem 802 may include, e.g., a keyboard, mouse, graphical user interface, touchscreen, or other interfaces for input, and, e.g., an LED or other flat screen display, or other interfaces for output, including application program interfaces (APIs). Elements of embodiments of the disclosure, such as the chatbot engine 102 and end user device 110 may be implemented with a computer system or cluster of computer systems, such as that of computer system 800.

Program code may be stored in non-transitory computer-readable media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include specialized processing units (e.g., GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810.

Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 800. In particular, the elements of chatbot engine 102 and end user device 110 may be computer-implemented. Some elements and functionality may be implemented locally and others may be implemented in a distributed fashion over a network through different servers, e.g., in client-server fashion, for example. In particular, server-side operations may be made available to multiple clients in a software as a service (SaaS) fashion.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

What is claimed is:

1. A system for resolving an issue with one or more objects, wherein each object is accessible by one of more users of a customer, the system comprising:
   one or more memories storing instructions; and
   one or more processors, coupled to at least one of the one or more memories, for executing instructions to cause the system to:
      receive information based on a single coded optical indicium indicating an intent of a virtual agent conversation, wherein the intent identifies an issue to be resolved, and is one of a plurality of intents corresponding to a plurality of respective issues to be resolved with assistance of the virtual agent; and
      based on the intent, process the information to further resolution of the issue.

2. The system of claim 1, wherein the received information further specifies at least one parameter, wherein the at least one parameter represents supplemental information required for resolution of the issue.

3. The system of claim 2, at least one of the one or more memories storing at least one instruction to cause the system to provide a service agent associated with the customer with a request to resolve the issue based upon the intent and the at least one parameter.

4. The system of claim 1, wherein resolution of the issue does not require further information to be input by a user.

5. The system of claim 1, at least one of the one or more memories storing at least one instruction to cause the system to provide a service agent associated with the customer with a request to resolve the issue based upon the intent.

6. The system of claim 1, wherein the issue to be resolved comprises a problem with a physical object or with a service.

7. The system of claim 1, at least one of the one or more memories storing at least one instruction to cause the system to automatically activate an application for resolving the identified issue based on the one or more coded optical indicia.

8. A computer-implemented method for resolving an issue with one or more objects, wherein each object is accessible by one of more users of a customer, the method comprising:
   receiving information based on a single coded optical indicium indicating an intent of a virtual agent conversation, wherein the intent identifies an issue to be resolved, and is one of a plurality of intents corresponding to a plurality of respective issues to be resolved with assistance of the virtual agent;
   based on the intent, processing the information to further resolution of the issue.

9. The method of claim 8, wherein the received information further specifies at least one parameter, wherein the at least one parameter represents supplemental information required for resolution of the issue.

10. The method of claim 9, further comprising providing a service agent associated with the customer with a request to resolve the issue based upon the intent and the at least one parameter.

11. The method of claim 8, wherein resolution of the issue does not require further information to be input by a user.

12. The method of claim 8, further comprising providing a service agent associated with the customer with a request to resolve the issue based upon the intent.

13. The method of claim 8, wherein the issue to be resolved comprises a problem with a physical object or with a service.

14. The method of claim 8, further comprising automatically activating an application for resolving the identified issue based on the one or more coded optical indicia.

15. One or more non-transitory computer-readable media storing instructions for resolving an issue with one or more objects, wherein each object is accessible by one of more users of a customer, wherein the instructions, when executed by one or more computing devices, cause at least one of the one or more computing devices to:
   receive information based on a single coded optical indicium indicating an intent of a virtual agent conversation, wherein the intent identifies an issue to be resolved, and is one of a plurality of intents corresponding to a plurality of respective issues to be resolved with assistance of the virtual agent;
   based on the intent, process the information to further resolution of the issue.

16. The one or more non-transitory computer-readable media of claim 15, wherein the received information further specifies at least one parameter, wherein the at least one parameter represents supplemental information required for resolution of the issue.

17. The one or more non-transitory computer-readable media of claim 16, storing at least one instruction to cause at least one of the one or more computing devices to provide a service agent associated with the customer with a request to resolve the issue based upon the intent and the at least one parameter.

18. The one or more non-transitory computer-readable media of claim 15, wherein resolution of the issue does not require further information to be input by a user.

19. The one or more non-transitory computer-readable media of claim 15, storing at least one instruction to cause at least one of the one or more computing devices to provide a service agent associated with the customer with a request to resolve the issue based upon the intent.

20. The one or more non-transitory computer-readable media of claim 15, wherein the issue to be resolved comprises a problem with a physical object or with a service.

21. The one or more non-transitory computer-readable media of claim 15, storing at least one instruction to cause at least one of the one or more computing devices to automatically activate an application for resolving the identified issue based on the one or more coded optical indicia.

* * * * *